(12) United States Patent
Hegde et al.

(10) Patent No.: US 7,885,940 B2
(45) Date of Patent: Feb. 8, 2011

(54) METHODS AND SYSTEMS FOR MONITORING OBJECTS

(75) Inventors: Prashant P. Hegde, Bangalore (IN);
Chethan Anand Bs, Bangalore (IN);
Keith McCloghrie, Pawling, NY (US);
Ian Wallis, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 451 days.

(21) Appl. No.: 11/173,737

(22) Filed: Jun. 30, 2005

(65) Prior Publication Data

US 2007/0005641 A1 Jan. 4, 2007

(51) Int. Cl.
*G06F 7/00* (2006.01)
(52) U.S. Cl. .................. 707/687; 709/223; 709/224; 709/225; 709/226; 719/316
(58) Field of Classification Search ................ 707/1; 709/223; 719/316
See application file for complete search history.

(56) References Cited

U.S. PATENT DOCUMENTS

| | | | | | |
|---|---|---|---|---|---|
| 5,764,977 | A | * | 6/1998 | Oulid-Aissa et al. | 707/10 |
| 6,122,639 | A | * | 9/2000 | Babu et al. | 707/103 R |
| 6,125,369 | A | * | 9/2000 | Wu et al. | 707/201 |
| 6,532,491 | B1 | * | 3/2003 | Lakis et al. | 709/223 |
| 6,574,197 | B1 | * | 6/2003 | Yaguchi et al. | 370/252 |

* cited by examiner

*Primary Examiner*—William C Vaughn, Jr.
*Assistant Examiner*—Maceeh Anwari
(74) *Attorney, Agent, or Firm*—Fish & Richardson P.C.

(57) ABSTRACT

A method and system for monitoring objects in a plurality of management information bases (MIBs) is provided. The objects required for functioning of an application are identified from the MIBs. The application identifies these objects. The identified OIDs are grouped in a group depending on grouping rules provided by the application. A rate for detecting changes in the group is provided. The changes in the group are detected at the provided rate. A notification is generated on detecting a change in the group. The notification is sent to the application. The notification reports a change in the identified OIDs in the group.

20 Claims, 4 Drawing Sheets

US 7,885,940 B2

METHODS AND SYSTEMS FOR MONITORING OBJECTS

BACKGROUND OF THE INVENTION

1. Field of Invention

Embodiments of the invention relate in general to the field of networking. More specifically, the embodiments of the invention relate to methods and systems for network management.

2. Description of the Background Art

Many of the network management functions performed by management applications require an initial stage of learning what is in the network and how it is configured, followed by an on-going requirement to monitor for changes in the configuration and/or in network state. One example of such an application is Inventory Management, which is responsible for collecting an inventory of all the managed devices in the network and building a local database of information. This information is used by other applications such as Inventory reporting, Configuration Management, Software Image Management, or any other. The information is stored in Management Information Bases (MIBs). Thus, MIBs contribute in the network management operations.

MIB is a conceptual database that stores network information. The MIB is a hierarchically structured collection of objects. Each object represents a particular type of information regarding the configuration or the state of a network device in a network. Exemplary network devices include, but are not limited to switches, routers, computers, and servers. A network management application, such as, 'Inventory Management', uses Simple Network Management Protocol (SNMP) to retrieve the information stored in one or more MIBs on the network devices. The network management applications make a local cache of the retrieved information for performing various management functions, such as, managing configurations of network devices, monitoring the network devices for faults and monitoring performance of the network devices.

The configuration and state of the network components in the network changes with time. For example, the active state of a network component may change to an inactive state in the event of failure of the network component. The information in the MIB is required to be monitored for these changes. Various methods and systems exist for monitoring changes in the MIB objects. One such method is user triggered, wherein the network information is updated when a network operator requests the management application for the same. In another method for monitoring MIB objects, the network operator programs the network management application to periodically update the network information using SNMP. However, this method results in redundancy of collection of network information.

The above two methods result in significant bandwidth usage of communication channels. In addition, these methods require significant usage of memory and processing unit of the network devices. This is because the information in the MIB is updated even in the event when the configuration and state of each network device in the network remains unchanged.

In another method for monitoring objects, a notification for a change in the information of the network device is sent to a network management application using SNMP. These notifications are in the form of syslogs or traps. This method requires syslogs or traps to be associated with the information required by each of the network management applications in the network. Further, the change notifications may not pertain to the information that the network management application requires. Thus, the entire information about the network device has to be updated by the network management application.

Selective polling is still another method for monitoring objects in the network. According to this method, indicator variables are defined in the MIB. An indicator variable is associated with a type of network information. A change in the indicator variables is determined by polling. The indicator variables are polled for detecting changes in the associated network information among the network devices. However, indicator variables are not available for every type of network information. In addition, the indicator variables are required to be polled periodically. Periodic polling still results in additional, albeit reduced usage of bandwidth of the communication channel.

Granular collection is yet another method for monitoring the MIB objects. In this method, the network information is divided logically into subsets. For example, flash information and inventory management can be subsets of network inventory information. The changes in the subsets are monitored by notification. The changed subsets are updated. The process of collection can be optimized by updating only those subsets that have undergone a change. However, the subsets further comprise a plurality of objects and changes in particular objects are not observed.

DETAILED DESCRIPTION OF EMBODIMENTS OF THE INVENTION

Various embodiments of the invention provide methods, systems and machine-readable media for monitoring objects in a plurality of Management Information Bases (MIBs).

In an embodiment, the invention provides a method for monitoring objects in a plurality of Management Information Bases (MIBs) of network devices. A network management application identifies one or more Object Identifiers (OIDs) from the plurality of MIBs. The identified OIDs are grouped together. A rate for detecting changes in the group is provided. According to an embodiment, the rate of detection can be provided by the management application. According to another embodiment, an agent that resides on the network devices can provide the rate of detection. The changes in the group are detected at the provided rate.

Figure 1:
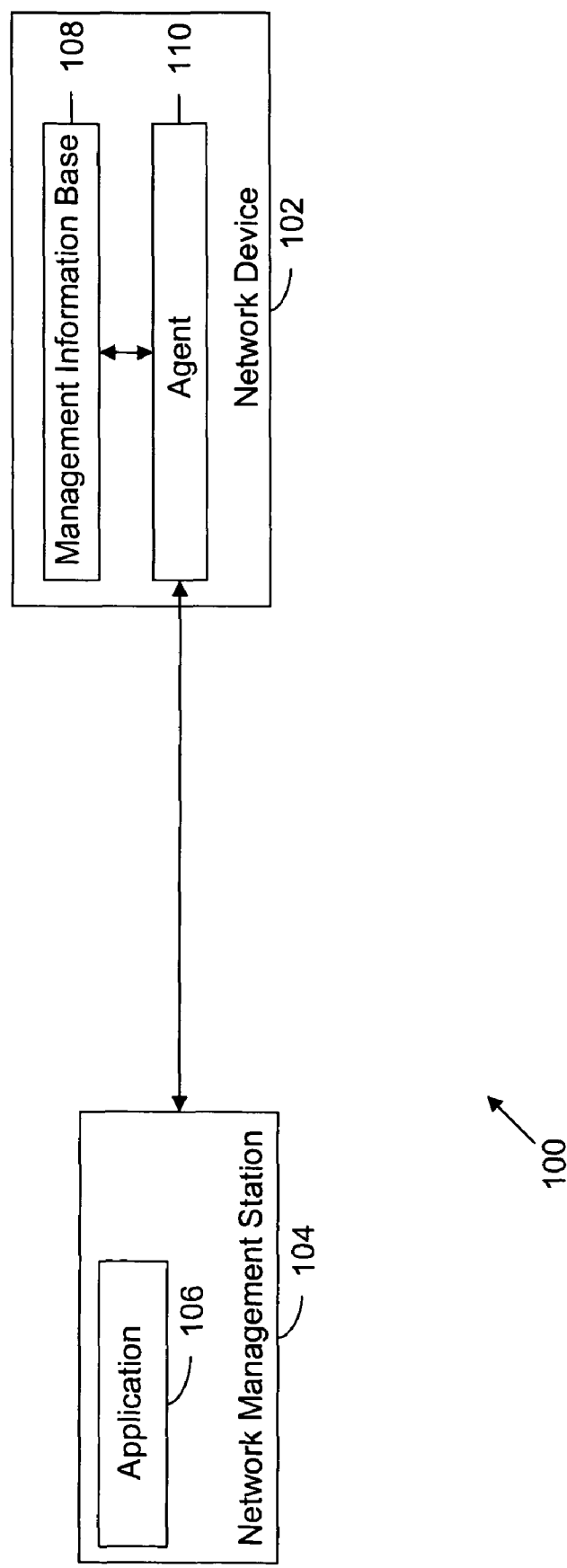
FIG. 1 illustrates a network in which an exemplary embodiment of the invention can be practiced.

FIG. 1 illustrates a network 100 in which an exemplary embodiment of the invention can be practiced. Examples of network 100 can be a local area network, a wide area network or any other network known to a person skilled in the art. In an exemplary embodiment, network 100 is the Internet. Network 100 can include a network device 102. However, according to various embodiments of the invention, network 100 can consist of any number of network devices. Examples of a network device include, but are not limited to, router, switch, server, printer, and computer. These network devices can be managed by a network management station 104. Network management station 104 monitors and controls the activities of network 100 and the network devices in it. Examples of network management station 104 include, but are not limited to, general-purpose computers, computing devices, laptops, and system administrator computer. The management activities can be further monitored and controlled by an application 106. According to various embodiments, application 106 is a management program in network management station 104. Application 106 can perform specific management functions, such as, managing configurations of network device 102, monitoring network device 102 for faults, and monitoring performance of network device 102. Application 106 can perform the monitoring and control activities with the help of Management Information Bases (MIBs) and agents that are present in network device 102. According to various embodiments, network device 102 can include an MIB 108 and an agent 110.

Management Information Base (MIB) is a conceptual database, which stores network management information. In an exemplary embodiment, MIB 108 stores the information about network device 102. According to various embodiments of the invention, the information in MIB 108 is stored in the form of objects. Each object can represent a particular type of information regarding the configuration or the state of a network device. All the objects in MIB 108 are hierarchically structured. Each object in MIB 108 can be represented by Object Identifiers (OIDs).

According to various embodiments of the invention, agent 110 is a program that provides an interface between MIB 108 and application 106. Agent 110 tracks the information in MIB 108. This is because the configurations and states of network device 102 may change with time. These changes are reflected as changes in the OIDs of MIB 108. For example, the active state of network device 102 may change to an inactive state in the event of a failure. These changes are updated in MIB 108 corresponding to network device 102. Thus, continuous monitoring of MIB 108 is required.

Agent 110 can periodically provide application 106 with the information that is available in MIB 108. This information can be in the form of the status of all the OIDs. According to an exemplary embodiment, application 106 informs agent 110 about a specific set of OIDs that is desired by application 106. In this case, agent 110 can provide the specified OIDs on receiving a request from application 106. According to various embodiments, application 106 may request for the information only when a change occurs in one or more OIDs in MIB 108. In this case, agent 110 can send a notification to application 106 when a change is tracked in one or more OIDs in MIB 108. According to an embodiment, the notification may be sent along with information relating to the OIDs that have changed. This information can include the OID that has changed, the time at which the change has occurred etc. In another embodiment, application 106 can specify the OIDs for which agent 110 sends notification. Control information that is generated by application 106 can be provided to MIB 108 through agent 110.

Figure 2:
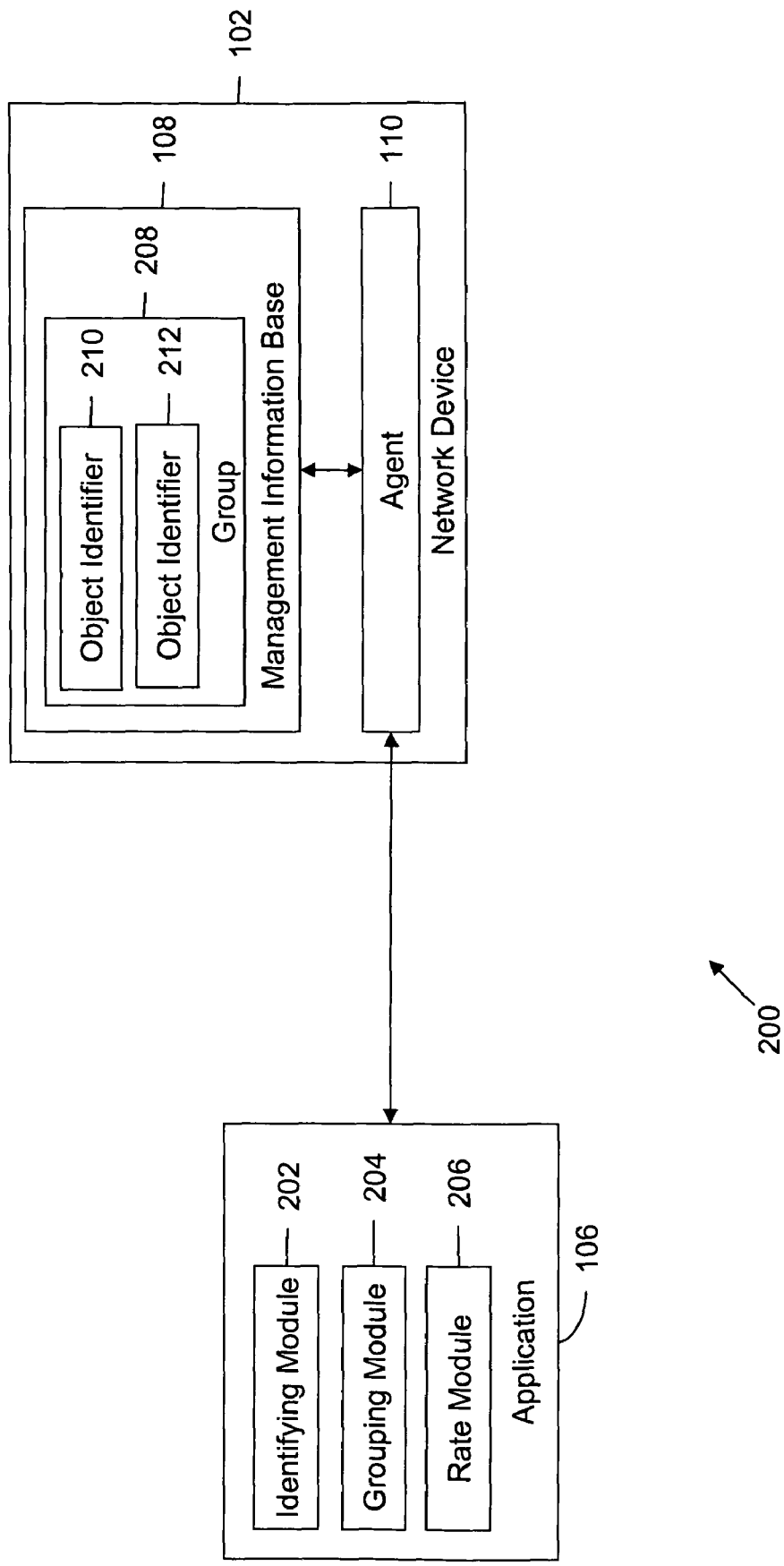
FIG. 2 is a block diagram of a system for monitoring objects in a plurality of Management Information Bases (MIBs), in accordance with an exemplary embodiment of the invention.

FIG. 2 is a block diagram of a system 200 for monitoring objects in a plurality of Management Information Bases (MIBs), in accordance with an exemplary embodiment of the invention. In an exemplary embodiment, system 200 includes application 106 and network device 102. Application 106 includes an identifying module 202, a grouping module 204 and a rate module 206. Network device 102 includes MIB 108 and agent 110. MIB 108 includes a group 208. According to various embodiments, MIB 108 can include a plurality of groups. Group 208 is a collection of a plurality of Object Identifiers (OIDs). According to an embodiment of the invention, group 208 is formed on the basis of functional similarity of the OIDs contained in it. For example, group 208 may be formed with OIDs that provide information about the configuration details of network device 102. According to an exemplary embodiment of the invention, group 208 consists of an OID 210 and an OID 212.

Identifying module 202 identifies the information that is required by application 106. Thus, in an embodiment, identifying module 202 identifies OIDs 210 and 212 corresponding to the information required by application 106. In another embodiment of the invention, application 106 specifies the OIDs that are required to be monitored in MIB 108.

Grouping module 204 provides grouping rules to application 106. Application 106 provides the grouping rules to network device 102. Agent 110 in network device 102 uses the grouping rules to group the identified OIDs. According to an exemplary embodiment of the invention, agent 110 groups OIDs 210 and 212 in group 208. Furthermore, rate module 206 provides the rate for detection of changes in OIDs 210 and 212 in group 208 to application 106. Further, application 106 provides this rate to agent 112. OIDs 210 and 212 are detected for changes by agent 110 at the provided rate for application 106.

Application 106 also provide network device 102 with additional information along with the OIDs to be monitored for changes and the rate for monitoring changes in the OIDs. The additional information can include the name of application 106, name of group 208, a group control parameter and the rate for detection of changes in group 208. According to various embodiments, name of application 106 indicates the name of the management application. The name identifies the creator of application 106. Furthermore, name of group 208 can specify the name, such as, 'configuration information'.

According to various embodiments, the group control parameter can take a value of 'enabled', 'enabledwithnotify' or 'disabled'. Application 106 chooses a value for the group control parameter. If application 106 chooses 'enabled', the monitoring of group 208 is enabled for application 106. Additionally, if application 106 chooses 'enabledwithnotify', the monitoring of group 208 is enabled for application 106 and if a change in a value of an object instance in group 208 is detected by agent 110, an SNMP notification, such as, SNMP trap is generated. In an exemplary embodiment of the invention, the SNMP notification includes the 'last changed time', which specifies the last time at which a change is detected in an OID in group 208. In various embodiments of the invention, the notification specifies the OID along with the 'last changed time'. In addition, the notification may also include the name of the group and the name of application 106 as a part of the SNMP trap. According to an embodiment, the monitoring for an application is disabled until group 208 is defined in MIB 108. Also, the monitoring for the application is disabled when group 208 is removed from MIB 108.

According to various embodiments, application 106 can request the frequency of detection of changes that occur in the objects. According to another embodiment, agent 110 can override this request by choosing a different value. This has been explained further in the subsequent description with reference to FIG. 3 and FIG. 4.

In various embodiments of the invention, identifying module 202, grouping module 204, rate module 206, and agent 110 can be implemented as software, hardware, firmware, or a combination thereof.

Figure 3:
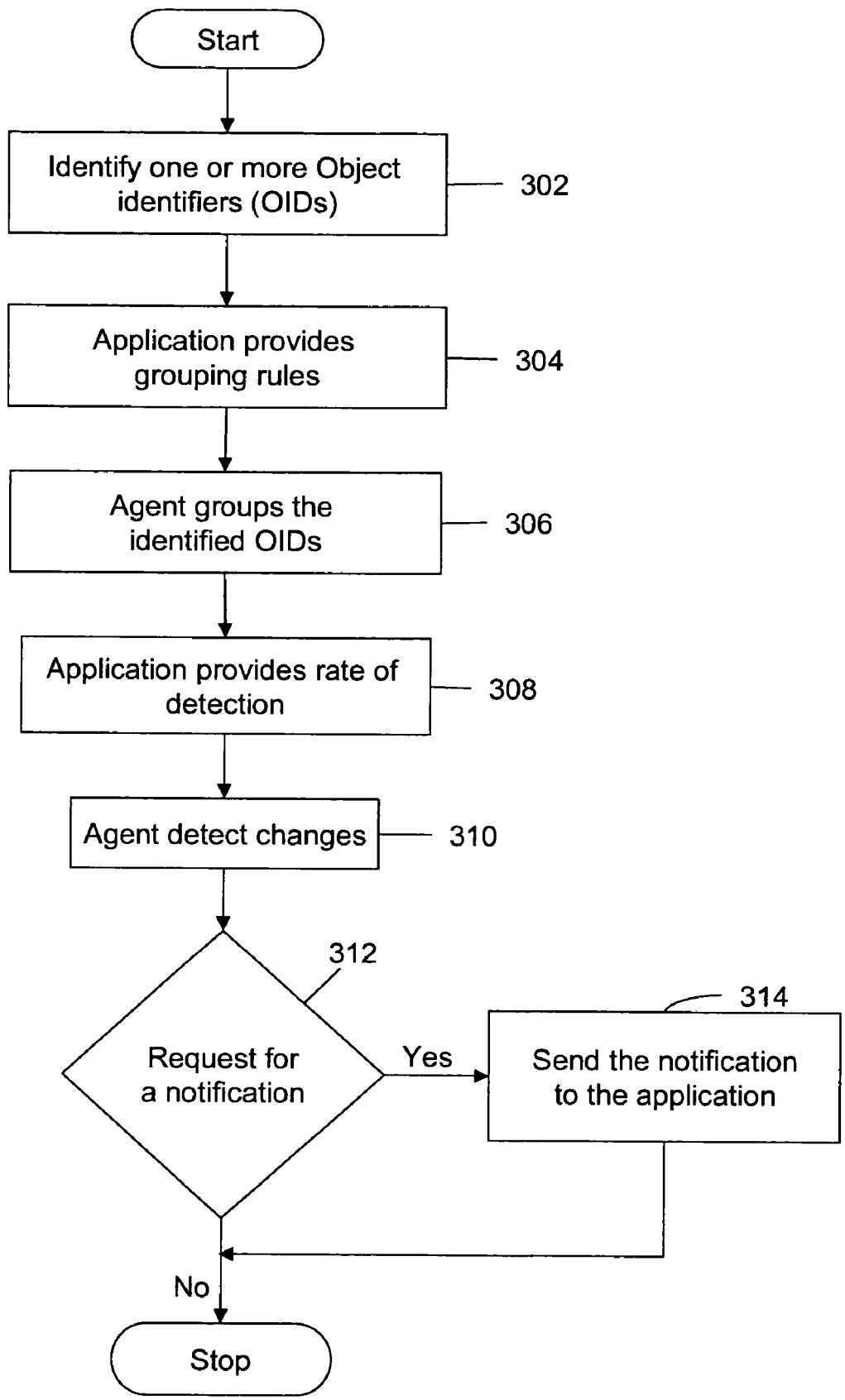
FIG. 3 is a flowchart illustrating a method for monitoring objects in a plurality of MIBs, in accordance with an exemplary embodiment of the invention.

FIG. 3 is a flowchart illustrating a method for monitoring objects in a plurality of Management Information Bases (MIBs), in accordance with an embodiment of the invention.

At step 302, one or more object identifiers (OIDs) are identified from a plurality of management information bases (MIBs). According to an exemplary embodiment, identifying module 202 in application 106 identifies the OIDs required for managing network 100. At step 304, application 106 provides grouping rules to network device 102. Agent 110 in network device 102 then groups the identified OIDs at step 306 depending on the grouping rules. At step 308, application 106 can provide the rate of detection of changes for the identified OIDs. This rate is sent to agent 110 along with the additional information. As mentioned earlier, the additional information may comprise the name of application 106, name of group, and the group control parameter. At step 310, agent 110 detects changes in the identified OIDs at the rate that is provided by application 106. At step 312, the method determines whether application 106 has chosen the value of the group control parameter as 'enabledwithnotify'. If yes, the method proceeds to step 314. At step 314, the notification is generated and sent to application 106.

Figure 4:
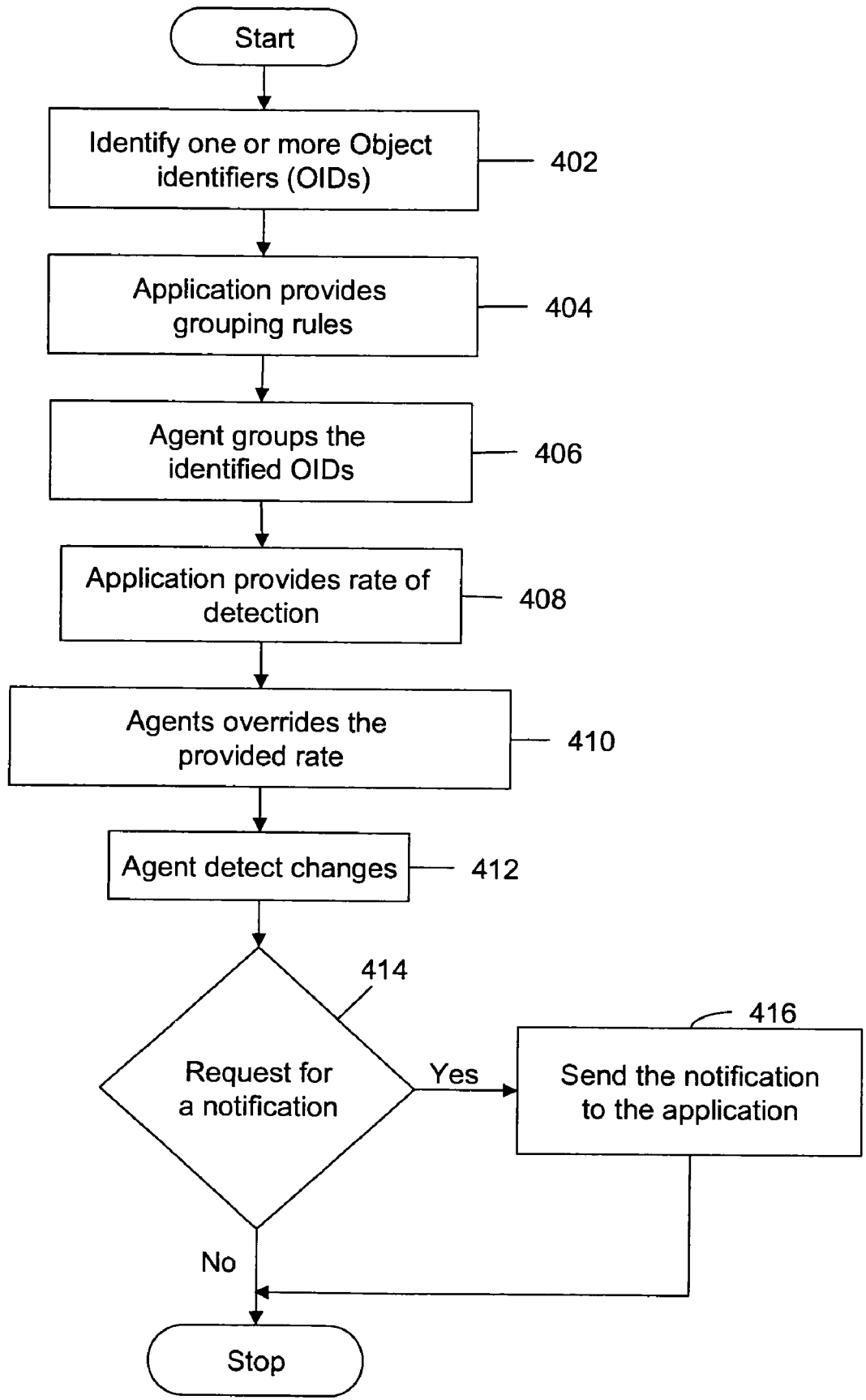
FIG. 4 is a flowchart illustrating another method for monitoring objects in a plurality of MIBs, in accordance with an exemplary embodiment of the invention.

FIG. 4 is a flowchart illustrating a method for monitoring objects in a plurality of Management Information Bases (MIBs), in accordance with another embodiment of the invention.

At step 402, one or more object identifiers (OIDs) are identified from a plurality of management information bases (MIBs). According to an exemplary embodiment, identifying module 202 in application 106 identifies the OIDs required for managing network 100. At step 404, application 106 provides grouping rules to network device 102. Agent 110 in network device 102 then groups the identified OIDs at step 406 depending on the grouping rules. At step 408, application 106 provides the rate for detection of changes for the identified OIDs. However, at step 410, agent 110 overrides the provided rate by choosing a different value. Agent 110 may set this value to be small if a group containing the identified OIDs contains a large number of object instances. This is because, if a large number of object instances in the group dynamically vary over a large range, then the corresponding value of the object also varies dynamically. When agent 110 chooses a lower rate of detection for these objects, the time spent on the monitoring tasks is reduced. In this way, the interference with the performance of network device 102 can be decreased.

At step 412, agent 110 detects changes in the identified OIDs at the determined rate for application 106. The determined rate can be the rate provided by application 106 or the rate provided by agent 110. At step 414, the method determines whether application 106 has chosen the value of the group control parameter as 'enabledwithnotify'. If yes, the method proceeds to step 416. At step 416, the notification is generated and sent to application 106.

Embodiments of the invention have the advantage that redundant data is not exchanged between the network devices and the network management stations. As a result, the unnecessary usage of network bandwidth of the communication channel is prevented. Moreover, an application in a network device is saved from processing redundant data that reduces the usage and requirement of CPU and memory of the network device. In addition, scalability in managing large number of network devices in a network is achieved as limited data is exchanged for an application. Further, the data is monitored specific to an application and the application is notified regarding the change in the data with the time at which the data has changed. Also, the application can choose to create groups, such as, a port-view, a flash-view, image-view, or any other, whereby the application receives notification about changes in particular group.

Although the invention has been discussed with respect to specific embodiments thereof, these embodiments are merely illustrative, and not restrictive, of the invention. For example, a 'method for monitoring objects in a plurality of management information bases' can include any type of method, manual or automatic, to anticipate the needs of the method.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory. The computer readable medium may have suitable instructions for synchronously presenting multiple video program ID streams, such as on a display screen, or for providing for input or presenting in accordance with various embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims

What is claimed is:

1. A method for monitoring objects in a Management Information Base (MIB) of a network device, the method comprising:

identifying one or more Object Identifiers (OIDs) corresponding to the objects in the MIB for monitoring, wherein the objects represent configuration or state information about the network device;

determining grouping rules for grouping the identified OIDs in a group;

determining a rate for detection of changes in the group, wherein the rate of detection indicates a periodic monitoring time at which an application in a Network Management Station (NMS) desires the network device to periodically monitor at regular intervals for changes in the objects that correspond to the identified OIDs in the group, wherein one or more changes in the objects occur in between a first occurrence of the periodic monitoring time and a second occurrence of the periodic monitoring time;

sending a monitoring request, the grouping rules, and the rate of detection, from the application to the network device, wherein the network device periodically monitors for changes to the identified OIDs in the group in response to the monitoring request; and receiving a notification from the network device, the notification indicating the one or more changes to the identified OIDs in the group, the one or more changes occurring in between the first and second occurrences of the periodic monitoring time, wherein the notification is provided from the network device at the rate of detection and at the second occurrence of the periodic monitoring time.

2. The method according to claim 1, further comprising overriding the rate of detection using an agent in the network device when the number of the identified OIDs in the group is greater than a predetermined value.

3. The method according to claim 2, wherein the rate of detection is overridden to a lower rate.

4. The method according to claim 1, wherein an agent of the network device comprising the MIB detects a change in the identified OIDs of the MIB.

5. A method for monitoring objects in a Management Information Bases (MIB) of a network device, the method comprising:
   receiving identification of one or more Object Identifiers (OID) corresponding to the objects in the MIB for monitoring, wherein the objects represent configuration or state information about the network device;
   receiving grouping rules for grouping the identified OIDs in a group;
   receiving a rate for detection of changes in the group, wherein the rate of detection indicates a periodic monitoring time at which an application in a Network Management Station (NMS) desires the network device to periodically monitor at regular intervals for changes in the objects that correspond to the identified OIDs in the group, wherein one or more changes in the objects occur in between a first occurrence of the periodic monitoring time and a second occurrence of the periodic monitoring time;
   receiving a monitoring request and the rate of detection from the application, wherein the network device periodically monitors for changes to the identified OIDs in the group in response to the monitoring request;
   grouping the identified OIDs in a group based on the grouping rules; and
   providing a notification to the application, the notification indicating the one or more changes to the identified OIDs in the group, the one or more changes occurring in between the first and second occurrences of the periodic monitoring time, wherein the notification is provided from the network device at the rate of detection and at the second occurrence of the periodic monitoring time.

6. An apparatus for monitoring objects in a Management Information Base (MIB) of a network device, the apparatus comprising:
   a network management station (NMS) configured with applications comprising:
      an identifying module for identifying one or more Object Identifiers (OIDs) corresponding to the objects in the MIB for monitoring, wherein the objects represent configuration or state information about the network device;
      a grouping module for determining grouping rules to group the identified OIDs in a group; and
      a rate module for determining a rate for detection of changes in the group, wherein the rate of detection indicates a periodic monitoring time at which an application in the NMS desires the network device to periodically monitor at regular intervals for changes in the objects that correspond to the identified OIDs in the group, wherein one or more changes in the objects occur in between a first occurrence of the periodic monitoring time and a second occurrence of the periodic monitoring time; and
   an agent in the network device, the agent being coupled to the MIB, the agent being configured for monitoring the group at the rate of detection in response to a monitoring request received from the NMS to determine if any of the identified OIDs have changed, and to provide a notification to the application, the notification indicating the one or more changes in the identified OIDs, the one or more changes occurring in between the first and second occurrences of the periodic monitoring time, wherein the notification is provided from the network device at the rate of detection and at the second occurrence of the periodic monitoring time.

7. The apparatus according to claim 6, wherein the agent is configured to override the rate of detection when the number of the identified OIDs in the group is greater than a predetermined value.

8. An apparatus for monitoring objects in a Management Information Base (MIB) of a network device, the apparatus comprising:
   means for identifying one or more Object Identifiers (OIDs) corresponding to the objects in the MIB for monitoring, wherein the objects represent configuration or state information about the network device;
   means for determining grouping rules for grouping the identified OIDs in a group;
   means for determining a rate of detection of changes in the group, wherein the rate of detection indicates a periodic monitoring time at which an application in a Network Management Station (NMS) desires the network device to periodically monitor at regular intervals for changes in the objects that correspond to the identified OIDs in the group, wherein one or more changes in the objects occur in between a first occurrence of the periodic monitoring time and a second occurrence of the periodic monitoring time;
   means for sending a monitoring request, the grouping rules, and the rate of detection, from the application to the network device, wherein the network device periodically monitors for changes to the identified OIDs in the group in response to the monitoring request; and
   means for receiving a notification from the network device, the notification indicating the one or more changes to the identified OIDs in the group, the one or more changes occurring in between the first and second occurrences of the periodic monitoring time, wherein the notification is provided from the network device at the rate of detection and at the second occurrence of the periodic monitoring time.

9. The apparatus according to claim 8, further comprising means for overriding the rate of detection when the number of the identified OIDs in the group is greater than a predetermined value.

10. An apparatus for monitoring objects in a Management Information Base (MIB) of a network device, the apparatus comprising:
    a processing system including a computer processor coupled to a display and a user input device; and logic encoded in one or more non-transitory tangible media for execution by the computer processor, and when executed operable to: identify one or more Object Identifiers (OIDs) corresponding to the objects in the MIB for monitoring, wherein the objects represent configuration or state information about the network device;
    determine grouping rules for grouping the identified OIDs in a group; determine a rate for detection of changes in the group, wherein the rate of detection indicates a periodic monitoring time at which an application in a Network Management Station (NMS) desires the network device to periodically monitor at regular intervals for changes in the objects that correspond to the identified OIDs in the group, wherein one or more changes in the objects occur in between a first occurrence of the periodic monitoring time and a second occurrence of the periodic monitoring time;

send a monitoring request, the grouping rules, and the rate of detection, from the application to the network device, wherein the network device periodically monitors for changes to the identified OIDs in the group in response to the monitoring; and receive a notification from the network device, the notification indicating the one or more changes to the identified OIDs in the group, the one or more changes occurring in between the first and second occurrences of the periodic monitoring time, wherein the notification is provided from the network device at the rate of detection and at the second occurrence of the periodic monitoring time.

11. A non-transitory computer-readable storage medium including instructions executable by a computer processor, the storage medium comprising:

one or more instructions for identifying one or more Object Identifiers (OIDs) corresponding to objects for monitoring in a Management Information Base (MIB) of a network device, wherein the objects represent configuration or state information about the network device;

one or more instructions for determining grouping rules for grouping the identified OIDs in a group;

one or more instructions for determining a rate of detection of changes in the group, wherein the rate of detection indicates a periodic monitoring time at which an application in a Network Management Station (NMS) desires the network device to periodically monitor at regular intervals for changes in the objects that correspond to the identified OIDs in the group, wherein one or more changes in the objects occur in between a first occurrence of the periodic monitoring time and a second occurrence of the periodic monitoring time;

one or more instructions for sending a monitoring request, the grouping rules, and the rate of detection, from the application to the network device, wherein the network device periodically monitors for changes to the identified OIDs in the group in response to the monitoring request; and one or more instructions for receiving a notification from the network device, the notification indicating the one or more changes to the identified OIDs in the group, the one or more changes occurring in between the first and second occurrences of the periodic monitoring time, wherein the notification is provided from the network device at the rate of detection and at the second occurrence of the periodic monitoring time.

12. The method according to claim 1, wherein a group control parameter is used for the detection of the one or more changes.

13. The method according to claim 12, wherein the group control parameter comprises an enable value, a disable value, or an enable with notification value.

14. The method according to claim 13, further comprising selecting a value for the group control parameter using the application.

15. The method according to claim 5, wherein a group control parameter is used for the detection of the one or more changes.

16. The method according to claim 15, wherein the group control parameter comprises an enable value, a disable value, or an enable with notification value.

17. The method according to claim 16, further comprising selecting a value for the group control parameter using the application.

18. The apparatus according to claim 6, wherein the determination of changes in the group comprises use of a group control parameter.

19. The apparatus according to claim 18, wherein the group control parameter comprises an enable value, a disable value, or an enable with notification value.

20. The apparatus according to claim 19, wherein the network management station is configured to select a value for the group control parameter.

* * * * *